Patented Feb. 16, 1932

1,845,876

UNITED STATES PATENT OFFICE

HANS HUBER, OF WIESBADEN-BIEBRICH, GERMANY, ASSIGNOR TO THE FIRM CHEMISCHE WERKE VORM. H. & E. ALBERT, OF WIESBADEN-BIEBRICH, GERMANY

PROCESS FOR THE PRODUCTION OF ALUMINA AND ALKALI PHOSPHATES

No Drawing. Application filed March 23, 1931, Serial No. 524,771, and in Germany March 22, 1930.

This invention relates to a process for the production of alumina and alkali phosphates.

In the phosphoric acid industry, it has not yet been found possible to decompose native aluminium phosphates satisfactorily, so that alumina and phosphoric acid, or phosphates, can be recovered conjointly. The presence of phosphoric acid has a disturbing influence in the production of alumina from bauxite, and, similarly, the presence of alumina is a disturbing factor in the production of phosphatic salts from aluminiferous raw materials.

Hitherto, the sole method for the practical utilization of aluminium phosphates consisted in decomposing same by the aid of heat and carbon, under which conditions, in addition to phosphorus or phosphoric anhydride, the aluminium can be recovered, as cement, in the residual slag.

Up to the present, it has been impossible economically to treat aluminium phosphates by the wet method, there being no technically practicable method of separating the phosphoric acid from the alumina in alkaline solution. These aluminium phosphates have not yet been employed for the production of pure alumina. On the other hand, attempts have already been made to render the phosphoric acid utilizable in some form or other. However, in this case also, separation by chemical means has only been partially successful. For example, after opening up mineral aluminium phosphates with caustic alkalis, the precipitation of the alumina by means of sodium silicate fails, owing to the fact that the alumina carries down valuable quantities of alkali in the form of a low-grade compound of silica and alumina, and therefore unsuitable for further treatment.

My present invention discloses methods which enable phosphoric acid and alumina to be recovered by the decomposition of aluminium phosphates with alkalis, and in which the resulting alumina and alkali phosphate liquors can, if desired, be regenerated so that both the cation of the bases serving for the dissociation, and the cation of the phosphate, remain permanently in the circulation process.

The aluminium phosphates can be decomposed by boiling with caustic alkali liquors, without the application of positive pressure, a liquor being obtained which contains the tribasic sodium phosphate, caustic alkali and alumina in solution. The ratio of free alkali to alumina is approximately the same as in the alkaline decomposition of bauxite. If, in this first stage of the process, attempts be made to bring about the complete precipitation of the phosphoric acid as a tribasic alkali phosphate, by concentrating the entire solution, the object in view will not be attained, because:

1. A tribasic alkali phosphate, which is highly contaminated with alkali aluminate, is deposited from an alkali aluminate solution of this kind, and 2. The amount of alumina recoverable in a single decomposition is still inadequate.

The method to be adopted consists in first cooling the warm solution and separating the deposited sodium phosphate from the mother liquor. This mother liquor, which contains, in the form of aluminate, practically the whole of the aluminium from the first decomposition is employed, together with fresh caustic alkali. This operation is repeated several times, so that, after several operations, the mother liquors contain a sufficient amount of alumina to enable the latter to be economically precipitated without concentration. The aluminium content of the sodium phosphate recovered in this manner is about 1%, and this can be eliminated by recrystallization. Before precipitating the aluminium from the enriched mother liquor, which contains only small quantities of phosphoric acid, the latter is suitably precipitated with lime, and the aluminium can then be recovered, from this purified mother liquor, as aluminium hydrate by known means.

If a native aluminium phosphate be treated in this manner, the phosphoric acid is recovered almost completely, and the aluminium to the extent of about 70–90%. The yield of alumina depends on the silica content of the raw material, and will also reach nearly 100% when the aluminium is free from silica.

According to my present invention, the treatment and regeneration of the resulting solutions containing alumina and alkali phosphate may also be effected by forming insoluble phosphates, by reaction with bases, and immediately applying the alkali liquor separated therefrom by filtration, to the decomposition of a fresh charge of aluminium phosphate. The bases employed may be of inorganic, organic, or mixed character. The bases employed for the precipitation need not, however, be returned direct to the process, but, according to the invention, may be treated separately with regeneration of the bases serving for decomposition.

Example I 100 kg. of Redonda phosphate, containing 38% of $P_2O_5$, 9% of silica and 19.5% of $Al_2O_3$ were heated along with a solution of 95 kg. of NaOH. The solution, on being cooled to 15° C., furnished 137 kg. of trisodium phosphate, and the mother liquor contained 15.5 kg. of $Al_2O_3$. The whole of the mother liquor was employed, with 95 kg. of NaOH, for dissolving another 100 kg. of Redonda phosphate, this second operation furnishing 200 kg. of trisodium phosphate, whilst the aluminate mother liquor contained 32 kg. of $Al_2O_3$.

This mother liquor was employed in a third operation, with 100 kg. of Redonda phosphate and 95 kg. of NaOH. On cooling, 235 kg. of trisodium phosphate separated out, and the mother liquor already contained 50 kg. of $Al_2O_3$.

The aluminate mother liquor was returned for a fourth operation, in conjunction with 100 kg. of Redonda phosphate and 90 kg. of NaOH. On cooling, 230 kg. of trisodium phosphate were obtained, and the mother liquor contained 66 kg. of $Al_2O_3$.

The whole series of operations furnished a yield of 98.6% of sodium phosphate, and 55 kg. of pure $Al_2O_3$, corresponding to a 71% yield, were recovered from the liquor.

Example II

The alkaline solution of sodium aluminate and sodium phosphate obtained as set forth in the foregoing example, is precipitated with baryta. The resulting soda lye can be returned to the process for decomposing further quantities of aluminium phosphate. The barium phosphate formed is treated with sulphuric acid, barium sulphate being formed and separable from the liberated with prosphoric acid.

The resulting barium sulphate, in turn, is now converted, by reduction roasting in known manner, into barium sulphide which, on treatment with hydrochloric acid, furnishes barium chloride and sulphuretted hydrogen, which latter may be returned in known manner—as sulphuric acid—to the process, for decomposing the barium phosphate. By treatment, in alkaline solution, with sodium nitrate, the barium chloride can be converted into barium nitrate which, on being heated, again furnishes baryta for precipitating the phosphoric acid from the solution of sodium aluminate and sodium phosphate, whilst, on treatment with sulphuric acid, the sodium chloride from the decomposition of the barium chloride furnishes sodium sulphate, together with hydrochloric acid which, in turn, serves for the decomposition of the barium sulphate and is thus returned to the process. The sodium sulphate is employed, in known manner, for decomposing fresh quantities of sodium-aluminium phosphate, which operation, in addition to furnishing sodium aluminate and sodium phosphate, regenerates the sulphuric acid.

The process of the present invention therefore represents a combination of various known reactions which, in the new combination, enable aluminium oxide and phosphoric acid to be economically recovered from alkali aluminium phosphates, by means of the reagent substances, in a cyclical process consisting in precipitating, with barium hydroxide, the mother liquors obtained by the alkaline decomposition, converting the barium phosphate with sulphuric acid, reducing the resulting barium sulphate to sulphide, also in known manner, converting it, with hydrochloric acid, into barium chloride and transforming this latter, in alkaline solution, with sodium nitrate, into barium nitrate, which is then decomposed, by heat, into barium oxide to be returned, as such, to the process, the hydrochloric acid being regenerated, by means of sulphuric acid, in known manner.

Example III

A liquor, produced in known manner and containing sodium phosphate and sodium aluminate, is treated with silver nitrate. Silver phosphate and sodium nitrate are deposited, whilst, through the deposition of the phosphoric acid and the formation of sodium nitrate, the solution is supersaturated with sodium aluminate and is split up, even under gentle heating, into sodium hydroxide and alumina. The soda lye can be returned to the process, at once, for the dissociation of further quantities of aluminium phosphate. The reaction also enables the alumina to be precipitated from the aluminate, which, hitherto was practicable only in the presence of a large excess of soda lye, an operation naturally resulting in considerable losses of valuable alumina. It is, however, precisely by virtue of the presence of phosphate, provided in accordance with the invention, that the reaction which, otherwise is never quantitative, proceeds under staichiometric conditions as far as the formation of soda lye and alumina. The resulting precipitate of silver phosphate and alumina is now treated with ammonia, which forms soluble silver-ammonium phosphate compounds, readily decomposing, in turn, into ammonia and silver phosphate, whilst the alumina remains behind, insoluble, and can be removed. On treatment with hydrochloric acid, the silver phosphate is smoothly transformed into silver chloride and phosphoric acid. The silver chloride is readily decomposed into silver and chlorine, which is returned, as hydrochloric acid, into the process in known manner, whilst the silver is reconverted, with nitric acid, into silver nitrate solution, and the cycle recommences. In operating in this manner it is necessary to add continuously to the process nitric acid which leaves it as sodium nitrate. This nitrate can either be transformed into potassium nitrate or serve to oxidize the sulphur dioxide formed during the decomposition of sodium-aluminium phosphate by heat, and in this manner continuously regenerates the sulphuric acid, or sodium sulphate, required for the decomposition. Alternatively, the sodium nitrate obtained according to Example II, can be again brought into reaction with the barium chloride obtained in Example I, in presence of alkali, in which case barium nitrate and sodium chloride are formed, which can again be further treated in the manner there described. Consequently, the novelty of the method of operating described above is therefore to be found in that it specifies a procedure which enables the continued regeneration, during the process, of both the cation of the base serving for decomposition and the cation of the electrolyte serving for the precipitation of the phosphoric acid. This new process furnishes a quantitative separation of phosphoric acid and alumina, and is not to be confused with the frequently made attempts to precipitate the phosphates, present as impurities in aluminate liquors by means of lime or similar means. These attempts, hitherto practised in many places, for purifying the liquors, do not represent any gain in respect of the actual alumina process, inasmuch as they reduce the content of alumina as compared with alkali oxide, and the precipitation of calcium phosphate entails a further reduction in the yield of alumina. Attempts have also been made to purify these liquors by the intentional addition of further quantities of alkali phosphate, in order to facilitate, in this way, the separation of the silica deposit. All these attempts, however, failed to produce any satisfactory result, since they always positively entailed losses of valuable alumina, which are naturally avoided, in the new working method, through the continuous employment of all the substances in the cyclical process.

I claim:—

1. A process for the separate recovery of phosphoric acid and alumina in the alkaline decomposition of aluminium phosphates, which comprises repeatedly employing the mother liquor—left behind on the separation of the resulting alkali triphosphate from the hot decomposition liquor—for renewed decomposition, after being reinforced with caustic alkali, the mother liquor becoming continuously enriched in alkali aluminate and simultaneously impoverished in phosphate.

2. Embodiment of the process set forth in claim 1, in which both the cation of the base serving for decomposition, and the cation of the phosphate, remain continuously in the reaction, in the cyclical process, and are continuously regenerated by a combination of reactions which are known per se.

HANS HUBER.